Feb. 19, 1963 J. D. SABLE 3,078,451
DIGITAL TIME MODULATOR
Filed Oct. 22, 1959 3 Sheets-Sheet 3

INVENTOR.
Jerome D. Sable
BY
Arthur L. Collins
ATTORNEY

United States Patent Office 3,078,451
Patented Feb. 19, 1963

3,078,451
DIGITAL TIME MODULATOR
Jerome D. Sable, Haddonfield, N.J., assignor, by mesne assignments, to the United States of America as represented by the Secretary of the Navy
Filed Oct. 22, 1959, Ser. No. 848,171
1 Claim. (Cl. 340—347)

The present invention relates to a novel and improved digital time modulator wherein digital data may be conveniently converted into an accurate time delay. More specifically, the present invention relates to a novel and improved digital time modulator embodying a basic oscillator type time measuring unit and circuitry for providing time delays which are accurate to a predetermined fractional portion of one cycle or period of the oscillator time measuring unit.

In radar ranging and tracking systems it often becomes necessary and desirable to provide from digital data a pair of pulses spaced in time by an amount determined by the digital input. Although various types of devices known as digital-to-analog converters have been devised in the past, considerable difficulty has been experienced heretofore in providing such circuitry which is relatively uncomplicated in structure or design and yet provides an extremely high degree of accuracy.

It is therefore a principal object of the present invention to provide a novel and improved all electronic radar range tracking system of high accuracy.

It is a further object of the present invention to provide a novel and improved digital-to-analog converter.

It is a further object of the present invention to provide a novel and improved digital-to-analog converter which is particularly useful in a radar range tracking system.

Other objects and many of the attendant advantages of this invention will be readily appreciated as the same becomes better understood by reference to the following detailed description when considered in connection with accompanying drawing(s) wherein.

Figure 1:
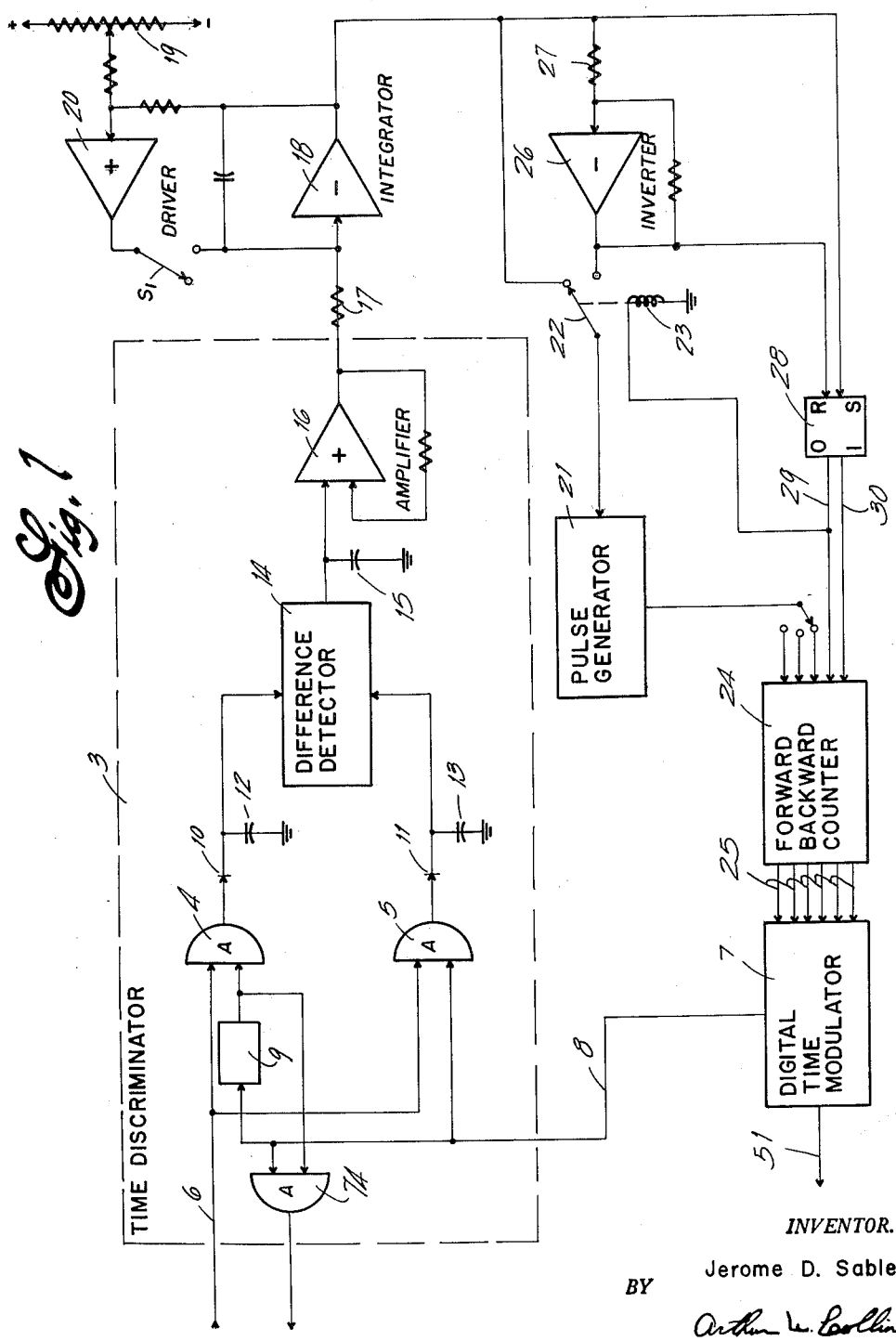
FIGURE 1 is a block diagram of a radar ranging and tracking circuit in which the improved digital-to-analog converter of the present invention is particularly useful.

A range tracking system of the type with which the improved digital time modulator might be used is illustrated in FIGURE 1 of the drawing. As shown there, the time discriminator 3 preferably takes the form of a conventional early and late gate discriminator. Thus, the coincidence circuits or the like 4 and 5 are energized directly by the target video input line 6 and by the range gate signal from the digital modulator 7 through line 8. Coincidence circuit 5 is energized directly from line 8 whereas coincidence circuit 4 is energized by the range signal on line 8 after its passage through the delay network 9. In this way the late gate is controlled so as to follow the early gate by approximately one pulse width. The gated outputs from coincidence circuits 4 and 5 are then respectively peak detected by the rectifier or diode elements 10 and 11 and the condensers 12 and 13. The difference detector 14 which is coupled to condensers 12 and 13 then compares the potentials developed thereacross and delivers an output pulse which is stored across condenser 15. This voltage developed across condenser 15 provides an ultimate measure of the time difference between the centroid of the incoming video signal and the center of the composite range gate developed in a manner to be described more specifically hereinafter by the digital modulator 7.

Changes in potential across condenser 15 are amplied in the feedback type amplifier 16 and fed through resistor 17 to the Miller-type integrator 18. The D.C. level of the grid of the Miller integrator 18 is selectively manually controlled by switch S–1 and the variable resistor 19 in the grid circuit of driver 20. The output circuit of the Miller integrator 18 is coupled to the pulse generator 21 through the armature 22 of relay 23 so as to modulate the frequency of the generator. The output of the pulse generator 21 is accumulated in the forward-backward counter 24 which converts the output of the generator into digital data which in turn is fed to the modulator 7 through lines 25 in a manner which will be more apparent hereinafter. The polarity inverter circuit 26 is also coupled to the output of the integrator through resistor 27 such that when energized it reverses the conventional flip-flop circuit 28 and energizes relay 23. When this occurs, the inverter output of integrator 26 is fed to the pulse generator 21 through the lower contact of relay 23, and the modulation voltage of the generator is maintained positive. Depending upon the condition of the flip-flop circuit 28 a signal calling for a subtraction or an addition operation in the counter 24 is transmitted through lines 29 and 30.

Figure 2:
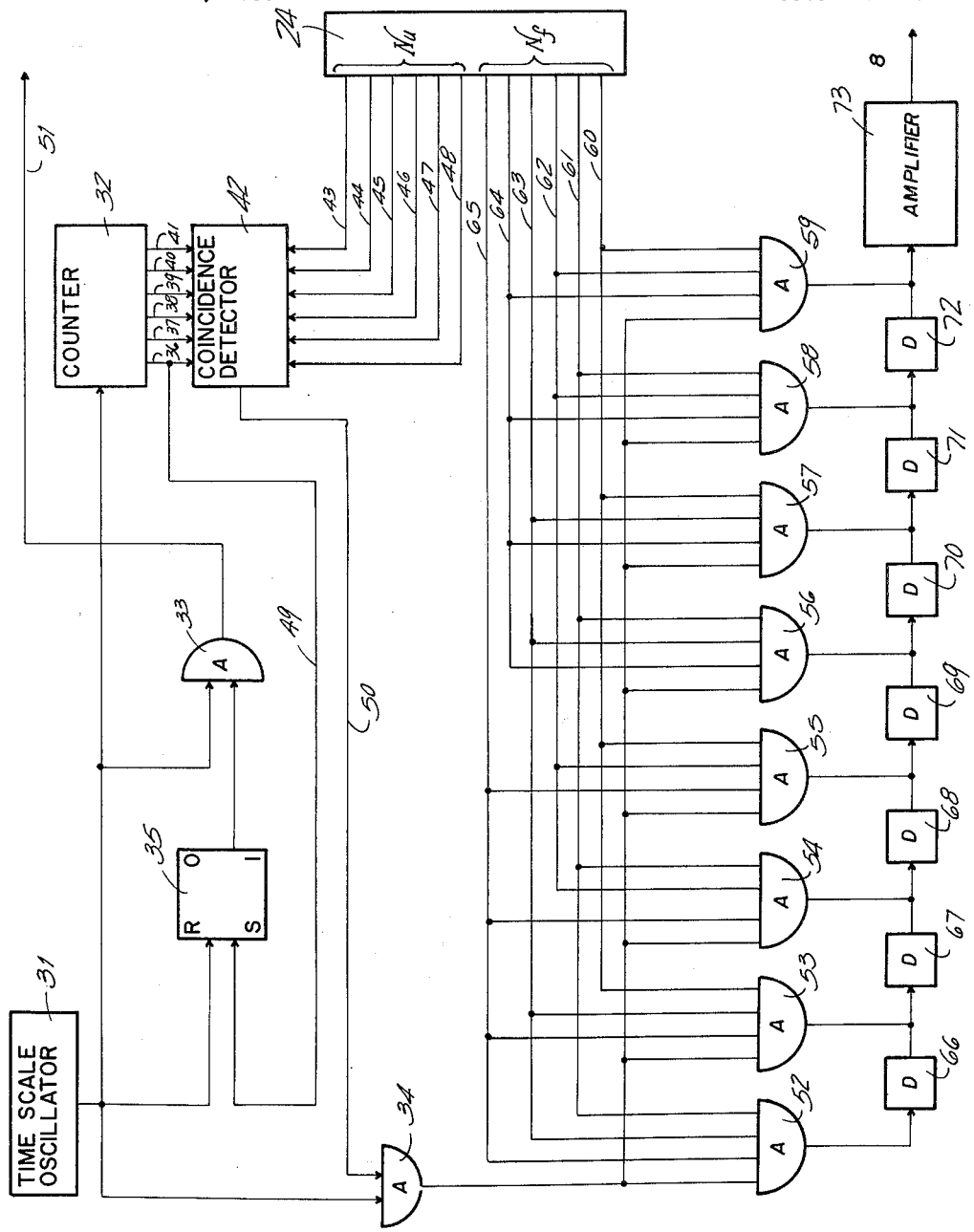
FIGURE 2 is a block diagram of one preferred embodiment of the improved digital-to-analog converter of the present invention.

One preferred embodiment of the improved digital time modulator of the present invention is illustrated in FIGURE 2 of the drawing. As shown therein, the binary input data accumulated in the counter 24 and transmitted to the modulator is subdivided into two basic binary numbers in a manner which will be described more fully hereinafter. One number $N_u$ represents the number of integer unit periods of oscillator 31 and the other number, $N_f$, represents the fractional portion of one integer period of oscillator 31. The output of the unit time scale oscillator 31 is connected to the counter 32, the "and" gates 33 and 34, and the flip-flop device 35. Lines 36–41 interconnect the output circuits of the counter 32 and one group of input circuits of the coincidence detector 42, and lines 43–48 couple the other group of input circuits of the coincidence detector 42 to the counter 24 such that the number $N_u$ is stored in detector 42. Output circuit 36 of counter 32 is connected to the flip-flop device 35 through line 49, and the output of the coincidence detector 42 is connected to the "and" gate 34 through line 50. The output of the "one" side of the flip-flop device 35 is connected to the input of "and" gate 33, and the output of gate 33 provides the synchronizing trigger pulse for the radar system through line 51. The output of the gate 34 energizes one circuit of each of the "and" gates 52–59. Lines 60–65 which transmit the number, $N_f$, in binary form from the counter 24 to the gates 52–59 condition a specific gate for energization depending on the value of $N_f$. Delay networks 66–72 are respectively connected to the outputs of gates 52–59, and the output of gate 59 is fed through the regenerative amplifier 73 to the gate 74, the delay network 9, and the gate 5 through line 8.

In operation the oscillator 31 pulses the counter 32 until the total accumulation thereof in the detector 42 coincides with the binary number established therein by the output $N_u$ from the counter 24. When this occurs, the detector 42 pulses gate 34 and each of the gates 52–59 are pulsed by gate 34 on the next pulse from oscillator 31. Depending upon which of the gates 52–59 are conditioned for energization by the output $N_f$ from counter 24, the amplifier 73 is energized after the pulse is fed through a predetermined number of the delay networks 66–72. The output of amplifier 73 provides the desired range pulse. When the counter 32 is returned to its zero condition, flip-flop device 35 is switched to its "one" state and the next pulse from oscillator 31 generates the synchronizing trigger for the radar system. The said next pulse from oscillator 31 also switches the flip-flop device back to its "zero" state so that the radar trigger is generated only at the beginning of each counting operation.

Figure 3:
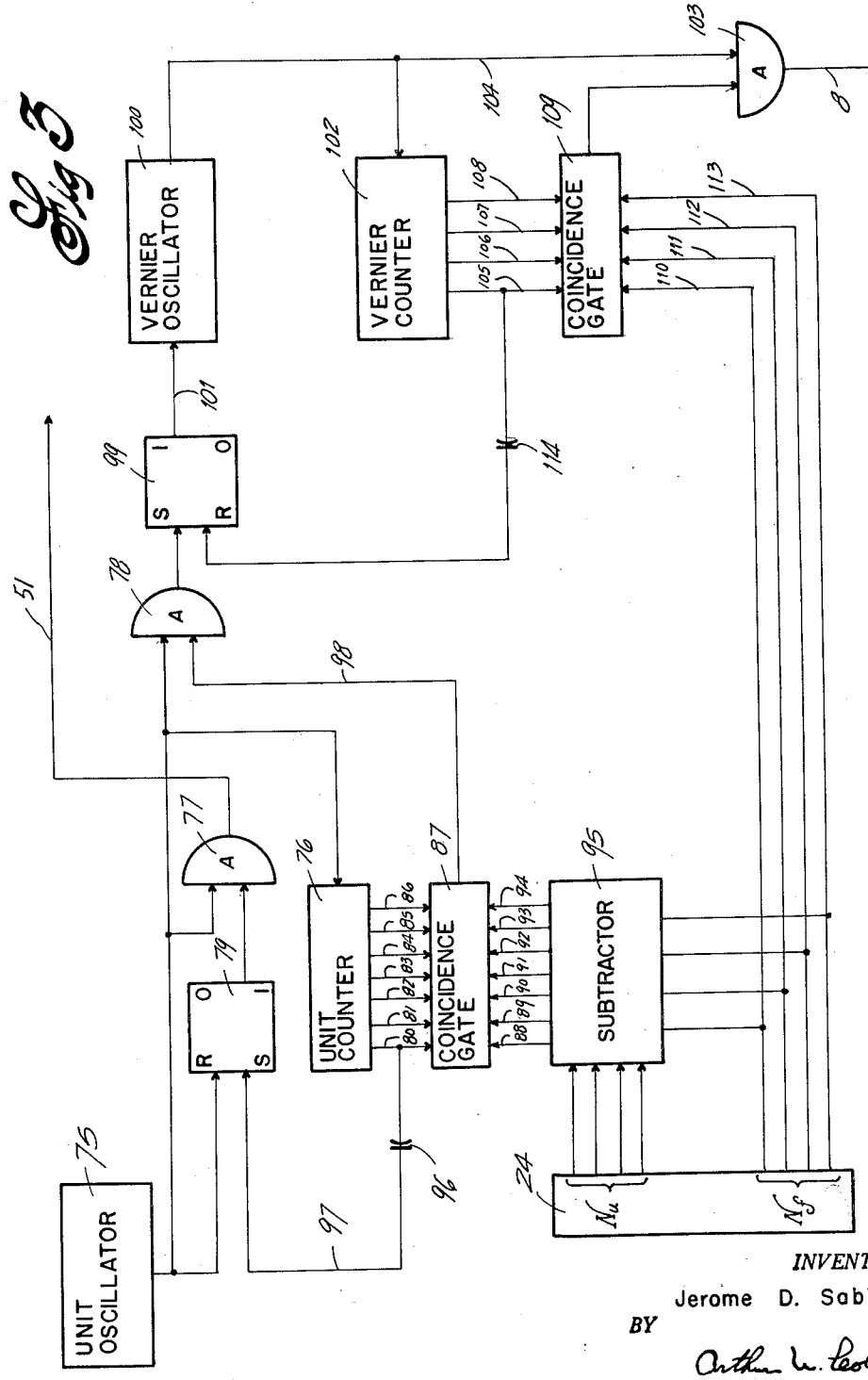
FIGURE 3 is a block diagram of another preferred embodiment of the improved digital-to-analog converter of the present invention.

Another preferred embodiment of the improved digital time modulator of the present invention is illustrated in FIGURE 3 of the drawing. As shown therein, the output of the unit time scale oscillator 75 is connected to the unit counter 76, the "and" gates 77 and 78, and the flip-flop device 79. Lines 80–86 interconnect the output circuits of the unit counter 76 and one group of input circuits of the coincidence gate 87, and lines 88–94 interconnect the other group of input circuits of the coincidence gate 88 with the subtractor 95. Binary output data $N_u$ and $N_f$ from the counter 24 energize the subtractor 95. Output circuit 80 of unit counter 76 is connected to the flip-flop device 79 through the condenser 96 in line 97, and the output of the gate 87 is connected to "and" gate 78 through line 98. The output of the "one" side of the flip-flop device 79 is connected to the input of "and" gate 77, and the output of gate 77 provides the synchronizing trigger pulse for the radar system. The output of gate 78 pulses the flip-flop device 99 so as to switch it to its "one" state and energize the vernier oscillator 100 through line 101. The output circuit of oscillator 100 pulses the vernier counter 102 and "and" gate 103 through line 104. Lines 105–108 interconnect the output circuits of the counter 102 and one group of input circuits of the coincidence gate 109, and lines 110–113 couple the other group of input circuits of gate 109 to counter 24 such that gate 109 is conditioned in a manner which reflects the value of number $N_f$. Output circuit 105 of counter 102 is coupled to the flip-flop device 99 through condenser 114. The output circuit of gate 109 also pulses gate 103, and the output circuit of gate 103 provides the desired range pulse on line 8.

In operation the subtractor 95 conditions the coincidence gate 87 such that gate 87 pulses "and" gate 78 when the counter 76 accumulates a total number of pulses from oscillator 75 which correspond to the difference between the binary inputs $N_u$ and $N_f$ from counter 24. When this occurs gate 87 and oscillator 75 energizes "and" gate 78, the flip-flop device 99 switches to its "one" state, and vernier oscillator 100 is energized. Oscillator 100 pulses the vernier counter 102 and when the total number of pulses accumulated in counter 102 corresponds to the present condition of coincidence gate 109, oscillator 100 and gate 109 energize "and" gate 103 and the desired range pulse is provided on line 8. The present condition of gate 109 is controlled by the value of the binary output $N_f$ of counter 24. When output circuit 105 of vernier counter 102 is reset to its zero condition, flip-flop device 99 is switched to its "zero" state so that oscillator 100 is de-energized and the circuit is ready for the next timing operation. When output circuit 80 of unit counter 76 is reset to its zero condition, flip-flop device 79 is switched to its "one" state and the next pulse from oscillator 75 generates the synchronizing trigger for the radar system.

Thus, it will be noted that after $N_u-N_f$ periods of the unit oscillator have elapsed, vernier oscillator 100 is energized and after an addiional interval of $N_f$ periods of the vernier oscillator have elapsed, the range pulse is generated. The following mathematical derivation shows that such an operation provides the desired time delay for the radar range pulse:

Let $t$=time interval to be generated.
$T_u$=period of the unit oscillator.
$N_v$=vernier factor (precision of unit oscillator is increased by this factor).

$T_v$=period of the vernier oscillator=$T_u\left(1+\dfrac{1}{N_v}\right)$ $N_u$=number of integer unit periods ($T_u$) in $t$.
$N_f$=number of integer fraction periods in $t$.

By definition as indicated above:

$$T_v = T_u\left(1+\frac{1}{N_v}\right) \tag{1}$$

Letting $T_u=1$:

$$T_v = 1+\frac{1}{N_v} \tag{2}$$

Transposing Equation 2:

$$N_v = \frac{1}{T_v}-1 \tag{3}$$

Also by definition as indicated above:

$$t = \frac{N_u+N_f}{N_v} \tag{4}$$

From Equation 3:

$$t = N_u+N_f(T_v-1) \tag{5}$$

Rearranging Equation 5:

$$t = (N_u-N_f)+N_f T_v \tag{6}$$

Thus, it is seen that a time delay of $N_u-N_f$ periods of the unit oscillator plus $N_f$ periods of the vernier oscillator provides a delayed pulse from binary data with an accuracy of vernier factor $N_v$ of the period of the unit oscillator.

When the vernier ratio $N_v$ is made a power of two, the binary point can be conveniently positioned in the counter such that the number to the left of the point is $N_u$ and the number to the right of the point is $N_f$.

Obviously many modifications and variations of the present invention are possible in the light of the above teachings. It is therefore to be understood that within the scope of the appended claim the invention may be practiced otherwise than as specifically described.

What is claimed is:

In a radar ranging and tracking system a digital-to analog converter wherein the data to be converted into analog form includes two basic binary digital numbers said converter comprising a unit oscillator; a first "and" gate, a second "and" gate, a flip-flop device, and a unit counter coupled to the output of the oscillator; a coincidence detector coupled to the output of the counter; a subtractor circuit which provides a binary output which is equivalent to the value of one of the said basic binary numbers reduced by the other said basic binary number; means for coupling the output of the subtractor circuit to the said coincidence circuit; means for switching the flip-flop device to one predetermined state when the unit counter is set at its zero position; means for coupling the flip-flop device to said first "and" gate and for providing a radar trigger pulse when said first gate is pulsed simultaneously by the unit oscillator and the flip-flop device; means for pulsing the second "and" gate when a number is accumulated in the counter that corresponds to the binary output of the subtractor circuit; a second flip-flop device which is set to one predetermined state when the second "and" gate is energized; a vernier oscillator coupled to the output of the second flip-flop device; a vernier counter and a third "and" gate coupled to the output of the vernier oscillator; a second coincidence detector coupled to the output of the vernier counter, said second detector being preconditioned for coincidence by a circuit which corresponds to an individual value of the said other basic binary number; means for switching the second flip-flop device to its other state when the counter is set to its zero position; and means for coupling the output of the second coincidence detector to said third "and" gate.

References Cited in the file of this patent
UNITED STATES PATENTS 2,865,564    Kaiser et al.    Dec. 23, 1958
2,894,254    Mork    July 7, 1959